United States Patent
Kulkarni et al.

(10) Patent No.: US 12,241,637 B2
(45) Date of Patent: Mar. 4, 2025

(54) DOMESTIC COOKING STOVE FOR COMBUSTION OF LPG FUEL WITH HIGH THERMAL EFFICIENCY

(71) Applicants: BHARAT PETROLEUM CORPORATION LIMITED, Maharashtra (IN); PETROLEUM CONSERVATION RESEARCH ASSOCIATION, New Delhi (IN)

(72) Inventors: Aniruddha Dilip Kulkarni, Uttar Pradesh (IN); Rahul Garg, Uttar Pradesh (IN); Satish Dayal Yadav, Uttar Pradesh (IN); Renny Andrew Moonjely, Uttar Pradesh (IN); Ravi Kumar Voolapalli, Uttar Pradesh (IN); Sanjay Bhargava, Uttar Pradesh (IN); Surendra Pratap, New Delhi (IN)

(73) Assignees: BHARAT PETROLEUM CORPORATION LIMITED, Maharashtra (IN); PETROLEUM CONSERVATION RESEARCH ASSOCIATION, New Delhi (IN)

(*) Notice: Subject to any disclaimer, the term of this patent is extended or adjusted under 35 U.S.C. 154(b) by 400 days.

(21) Appl. No.: 17/780,740

(22) PCT Filed: Nov. 27, 2020

(86) PCT No.: PCT/IB2020/061220
§ 371 (c)(1),
(2) Date: May 27, 2022

(87) PCT Pub. No.: WO2021/105947
PCT Pub. Date: Jun. 3, 2021

(65) Prior Publication Data
US 2022/0412566 A1 Dec. 29, 2022

(30) Foreign Application Priority Data
Nov. 27, 2019 (IN) .............................. 201921048627

(51) Int. Cl.
*F24C 3/08* (2006.01)
*F23D 14/58* (2006.01)
(Continued)

(52) U.S. Cl.
CPC .............. *F24C 3/085* (2013.01); *F23D 14/58* (2013.01); *F24C 3/008* (2013.01); *F24C 15/107* (2013.01); *F23D 2900/14062* (2013.01)

(58) Field of Classification Search
CPC ..................... F23D 14/58; F23D 14/06; F23D 2900/14062; F23D 14/28; F23D 14/48;
(Continued)

(56) References Cited

U.S. PATENT DOCUMENTS

| | | | |
|---|---|---|---|
| 2015/0007900 A1* | 1/2015 | Li | F23D 14/04 137/892 |
| 2019/0368739 A1* | 12/2019 | Cadima | F24C 3/082 |
| 2020/0340675 A1* | 10/2020 | Corbin | F23D 14/64 |

FOREIGN PATENT DOCUMENTS

| CN | 108758726 A | 11/2018 |
|---|---|---|
| CN | 109556144 A | 4/2019 |

(Continued)

*Primary Examiner* — Ko-Wei Lin
(74) *Attorney, Agent, or Firm* — D'Ambrosio & Menon, PLLC; Usha Menon (57) ABSTRACT

A domestic cooking stove comprises a frame that mounts a primary tube, one or more of nozzles for fuel injection, knobs for controlling the fuel injection, mixing tubes for modulating pressure gradient, burner tops for combustion of the air fuel mixture, and pan supports to support the vessel, heat reflectors to reflect heat, and legs to support the frame. Each heat reflector is positioned above burner top to provide secondary air entrainment for combustion by reducing a gap
(Continued)

between an inner circumference of heat reflector and an outer circumference of the burner top to minimize heat losses. The heat reflector has a curved orientation to reduce heat transfer in a downward direction and generates eddies that increases heat transfer towards vessel bottom. The legs are positioned below the frame and has a predetermined height to maintain a gap between table top and the frame bottom surface for entrainment of air.

9 Claims, 9 Drawing Sheets

(51) Int. Cl.
*F24C 3/00* (2006.01)
*F24C 15/10* (2006.01)

(58) Field of Classification Search
CPC .......... F23D 14/62; F24C 3/008; F24C 3/085; F24C 15/107; F24C 15/22; F24C 3/027; F24C 3/082
See application file for complete search history.

(56) References Cited

FOREIGN PATENT DOCUMENTS

| KR | 100794668 B1 | 1/2008 |
| KR | 101833950 B1 | 3/2018 |
| WO | 2011121609 A2 | 10/2011 |

* cited by examiner

DOMESTIC COOKING STOVE FOR COMBUSTION OF LPG FUEL WITH HIGH THERMAL EFFICIENCY

FIELD OF THE INVENTION

The present invention relates to a domestic cooking stove for combustion of fuel, for example, LPG or any other gaseous fuels like Compressed Natural Gas (CNG), Piped Natural Gas (PNG) used in domestic cooking stove. More particularly, the present invention relates to an energy efficient domestic Liquefied Petroleum Gas (LPG) cooking stove that facilitates combustion of LPG fuel at high thermal efficiency.

BACKGROUND OF THE INVENTION

In the current scenario, there is tremendous demand for fossil fuels. However, these fuels are depleting at a rapid rate. Efforts needs to be made to conserve the same. In order to meet the impending fuel crisis, extensive research is being carried out in the areas of fuel conservation and alternative fuels. Liquefied Petroleum Gas (LPG) is the most convenient and clean fuel for domestic use and is very popular these days. LPG is an exceptional energy source due to its origin, relative advantages, and applications.

The LPG stove manufacturing industry is about 50 years old and is mainly concentrated in the small-scale sector. LPG as a cooking fuel is a clean fuel. For domestic cooking applications, many LPG stove manufacturers are supplying Bureau of Indian Standards (BIS) certified LPG stoves in Indian market. BIS standard IS4246:2002 for domestic gas stoves specifies minimum thermal efficiency of 68%. There are many BIS approved stoves in Indian market which qualifies minimum requirement of thermal efficiency as per BIS.

In LPG cooking stove, there are various features such as primary air entrainment, burner port orientation and size of ports, design of heat reflector and pan support, and gap between burner top and vessel bottom, which play an important role in its thermal efficiency. Presently available LPG burners has an air entrainment mechanism, which has a scope for improvement which can result in further optimization of amount of primary air entering into the mixing tube along with LPG. Furthermore, currently available burner tops also has scope for improvement, for example, optimized port orientation, port area, size of ports, and their inclination angle. All these aspects finally affect the thermal efficiency for the domestic cooking stove.

Considering the depletion of fossil fuels at such a rapid rate and other aforementioned issues, there is a need to improve fuel efficiency to reduce the LPG import, as a step towards energy conservation. With its availability and environmental benefits, it has become necessary to develop a LPG cooking stove with higher thermal efficiency. Hence, there is a long-felt but unresolved need to modify the design of either one or more of: mixing tube, burner port orientation with attention to its size of ports, drip tray or heat reflector, and pan support considering a gap between burner top and vessel bottom, so that improved thermal efficiency is achieved in the working of the LPG stove.

SUMMARY OF THE INVENTION

It is intended that all such features, and advantages be included within this description, be within the scope of the present invention, and be protected by the accompanying claims. The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

The domestic cooking stove disclosed herein is for combustion of LPG fuel for application in domestic usage having high thermal efficiency, which addresses the above-mentioned need for modification in the burner port orientation, size of ports, design of heat reflector and pan support, design of mixing tube, leg height and loading height between burner top and vessel bottom. The domestic cooking stove disclosed here has undergone research that pertains to experimental and numerical methods, which improved combustion of LPG fuel and reducing the heat losses.

The domestic cooking stove comprises a frame that mounts a primary tube, one or more nozzles, one or more knobs, one or more mixing tubes, one or more burner tops, one or more pan supports, one or more heat reflectors, and multiple legs. The primary tube is mounted within the frame to receive fuel and each nozzle is in fluid communication with the primary tube to receive the fuel. The nozzle injects the fuel into the mixing tube at a controlled rate using each knob that is connected to the nozzle through a nozzle holder assembly. Each mixing tube is in fluid communication with each nozzle to receive the injected fuel from the nozzle. The mixing tube allows primary air entrainment through one or more slot openings and mixes the primary air with the injected fuel. The mixing tube modulates pressure gradient of the air-fuel mixture through a venturi and then the air-fuel mixture passes through a mixing cup/diffuser cup of the mixing tube towards the burner top.

Each burner top is coaxially positioned above the mixing cup/diffuser cup of the mixing tube and is in fluid communication with the mixing tube. The burner top comprises a set of inner ports and outer ports positioned on circumferential surface of the burner top to receive the air-fuel mixture from the mixing tube, and the received air-fuel mixture is ignited for combustion. Each pan support is fixed on the frame via pin holes to coaxially align the pan support with the burner top. The pan support comprises a circular metallic element with multiple metallic resting strips that support the bottom surface of a vessel to be heated. Each heat reflector is coaxially positioned with respect to the burner top and is rested on the frame.

The heat reflector aids in optimum secondary air entrainment for the combustion and to reduce an annular gap between an inner circumference of heat reflector and an outer circumference of the burner top to minimize heat losses. The heat reflector has a curved orientation to reduce heat transfer in a downward direction and generates eddies that increases recirculation of heat and increases heat transfer towards vessel bottom. An inner circumference of the heat reflector is formed to control the secondary air entrainment. The legs are positioned below the frame of the domestic cooking stove and has a predetermined height to maintain a gap between table top and the frame for entrainment of air.

In an embodiment, the burner top is designed with optimum orientation of the inner ports and the outer ports, number of the inner ports and the outer ports, a first angular tilt of the inner ports, a second angular tilt of the outer ports, and diameter of each of the inner ports and the outer ports. In an embodiment, the pan support is designed to create a loading height within a range between 15 mm and 25 mm, between the burner top and the bottom surface of the vessel. In an embodiment, the metallic resting strips of the pan support are positioned at the equidistant intervals with a controlled height for optimal distance between a burner top and the bottom surface of the vessel.

In an embodiment, the mixing tube comprises of the venturi having a converging section, a throat section, and a diverging section. The converging section increases velocity of the air-fuel mixture that is received through nozzle, the inlet opening, and the slot openings that are positioned after the inlet opening. The throat section is in fluid communication with the converging section to receive the high velocity air-fuel mixture. The throat section lowers pressure of the air-fuel mixture that facilitates transfer of more air through inlet opening. The diverging section of the venturi in fluid communication with the throat section regains the pressure of the air-fuel mixture that is transferred to a straight mixing zone of the mixing tube.

In an embodiment, the predetermined height of each leg is within a range between 16 mm and 24 mm to maintain the gap between the table top and the frame bottom surface for optimum entrainment of air. In an embodiment, the heat reflector has a predetermined thickness within a range between 0.3 mm and 0.7 mm. In an embodiment, the heat reflector has an internal diameter of 75 mm to 85 mm for vessel number 5 specified in BIS standard IS 4246: 2002, and an internal diameter of 65 mm to 75 mm for vessel number 4 specified in BIS standard IS 4246: 2002 to ensure a gap within a range between 0 mm to 5 mm, between the inner edge of the heat reflector and the outer edge of the burner top. In an embodiment, the domestic cooking stove has a thermal efficiency in a range between 73% and 75%.

BRIEF DESCRIPTION OF DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DESCRIPTION OF THE INVENTION

The present invention is directed to a domestic cooking stove for combustion of LPG fuel for application in domestic usage having high thermal efficiency. In addition to this, another objective is to develop a cooking stove with a potential for LPG savings and better performance. The above objective of the invention have been achieved through modified design that is based on experimental and numerical methods which results in an improved combustion of LPG fuel and enhanced heat transfer by reducing the heat losses.

Figure 1:
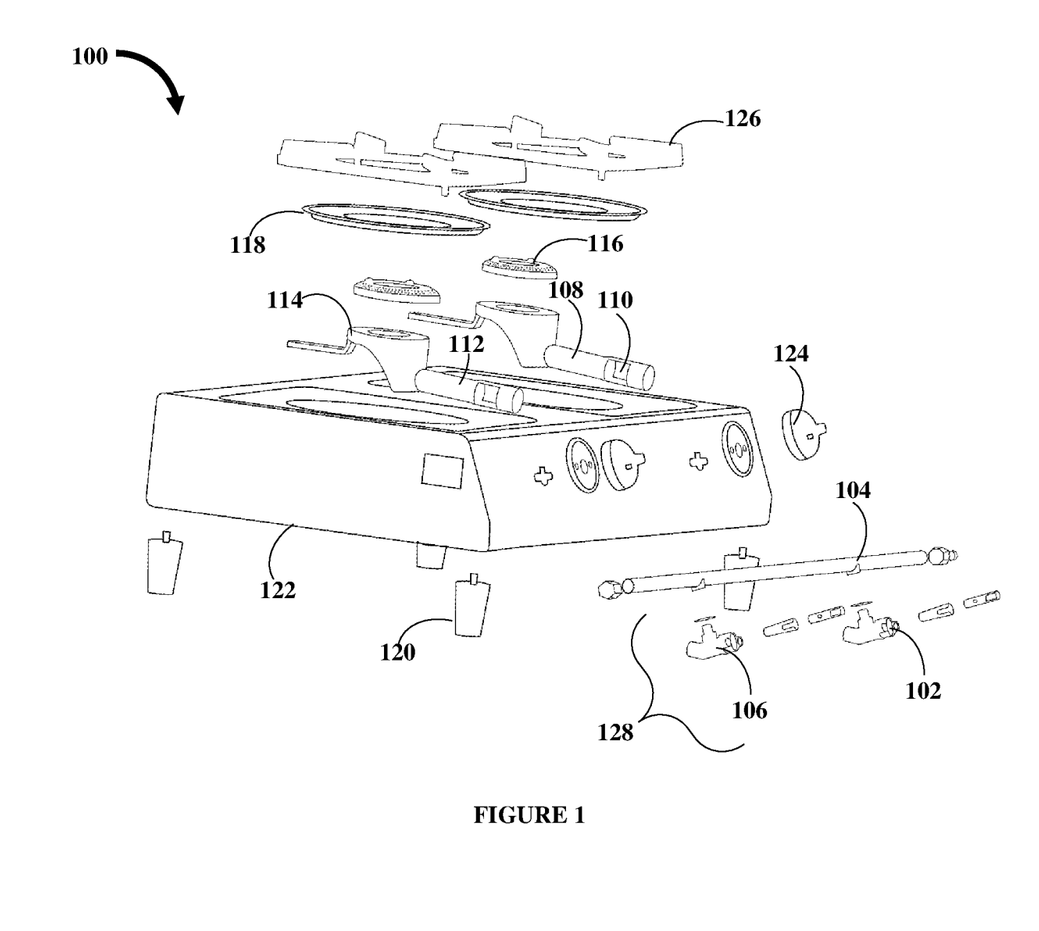
FIG. 1 shows an exploded view of a domestic cooking stove for combustion of LPG fuel, according to an exemplary embodiment.

FIG. 1 shows the exploded view of a domestic cooking stove 100 for combustion of LPG fuel, according to an exemplary embodiment. The nozzle holder 102 is machined and fitted to the primary tube 104. Gaseous fuel at line pressure is accelerated into the nozzles 106, and is expelled as jets into the mixing tube 108. Through the slot openings 110 of the mixing tube 108, the air from the atmosphere (primary air) is drawn into the mixing tube 108 due to the negative pressure in the section and propagates further. The amount of air which is aspirated depends on the opening area of each slot opening 110, nozzle gas flow rate (or gas exit velocity). The gas being injected from the nozzle 106 accelerates the inducted primary air and mixing of gas and air takes place. Due to the design of the nozzle 106, as the gas spray approaches the venturi throat, it becomes a relatively high velocity mixture that is created in the upstream slot opening 110 at a slight negative pressure relative to the atmospheric pressure. This high velocity mixture is then decelerated in mixing tube 108 (having a cylindrical pipe 112 attached to the mixing cup/diffuser cup 114) resulting in the increase in the static pressure.

The straight tube of the mixing tube 108 discharges into the mixing cup/diffuser cup 114 that has a profile for the air-gas mixture flow. The gas at the discharge of the mixing cup/diffuser cup 114 of the mixing tube 108 is at a slight positive pressure and then the air-gas mixture flows into the burner top 116. The burner top 116 is a solid end cap having multiple ports 302 and 304 (as shown in FIGS. 3A-3D) on the periphery. The ports 302 and 304 are of pre-determined diameters and placed at defined pitch. Since, the LPG stove is used for cooking purposes at home, a heat reflector 118 which is also a drip tray in functionality is provided to reflect the heat during combustion and to collect the spilled substance from any cooking pan that is positioned over the pan support 126. The legs 120 are provided at 4 corners of the frame 122 to provide the support to the frame 122 and to provide space for cleaning. Two knobs 124 are provided on the frame 122 whose position can be adjusted from 'Sim to full' enabling the user to control the gas flow rate as per the cooking requirement.

Figure 2:
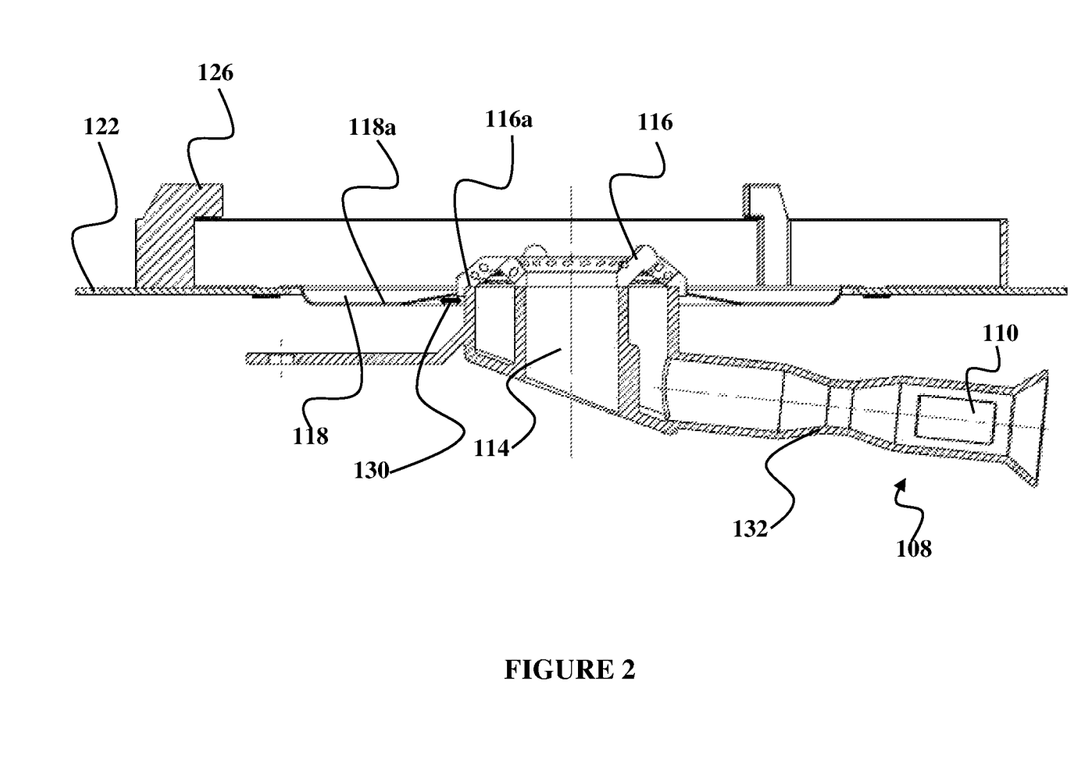
FIG. 2 shows a detailed view of the mixing tube, burner top, heat reflector, and pan support of the domestic cooking stove for combustion of LPG fuel, according to an exemplary embodiment.

FIG. 2 shows a detailed view of the burner top 116, mixing tube 108, heat reflector 118, and pan support 126 of the domestic cooking stove 100 for combustion of LPG fuel, according to an exemplary embodiment. As shown before in FIG. 1, the domestic cooking stove 100 comprises a frame 122 that mounts a primary tube 104, one or more nozzles 106, one or more knobs 124, one or more mixing tubes 108, one or more burner tops 116, one or more pan supports 126, one or more heat reflectors 118, and a plurality of legs 120. The primary tube 104 is mounted within the frame 122 to receive fuel and each nozzle 106 is in fluid communication with the primary tube 104 to receive the fuel and inject the fuel into the mixing tube 108 at a controlled rate using each knob 124 that is connected to the nozzle 106 through a nozzle holder assembly 128. Each mixing tube 108 is in fluid communication with each nozzle 106 to receive the injected fuel from the nozzle 106. The mixing tube 108 allows primary air entrainment through one or more slot openings 110 and mixes the primary air with the injected fuel. The mixing tube 108 then modulates pressure gradient of the air-fuel mixture through a venturi 132 and the air-fuel mixture passes through a mixing cup/diffuser cup 114 of the mixing tube 108 towards the burner top 116.

Figure 3A:
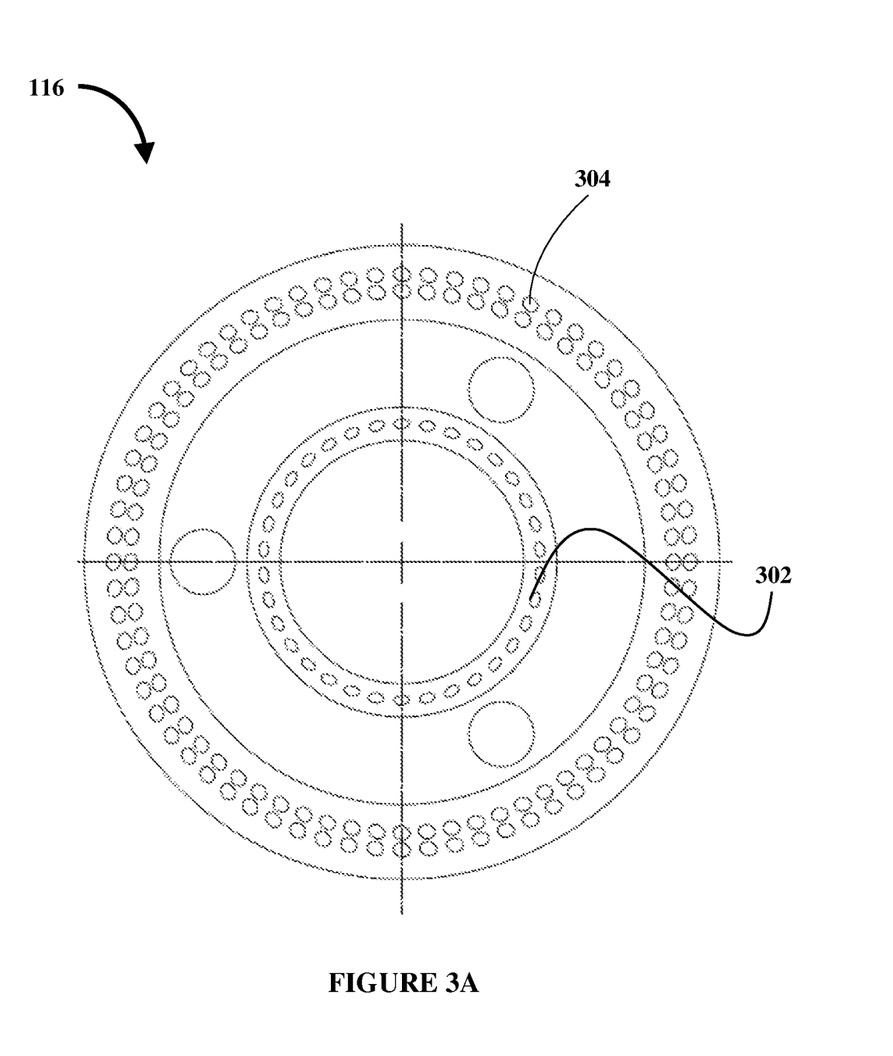
FIG. 3A shows a top view of the burner top of the domestic cooking stove, for combustion of LPG fuel, according to an exemplary embodiment.
Figure 5A:
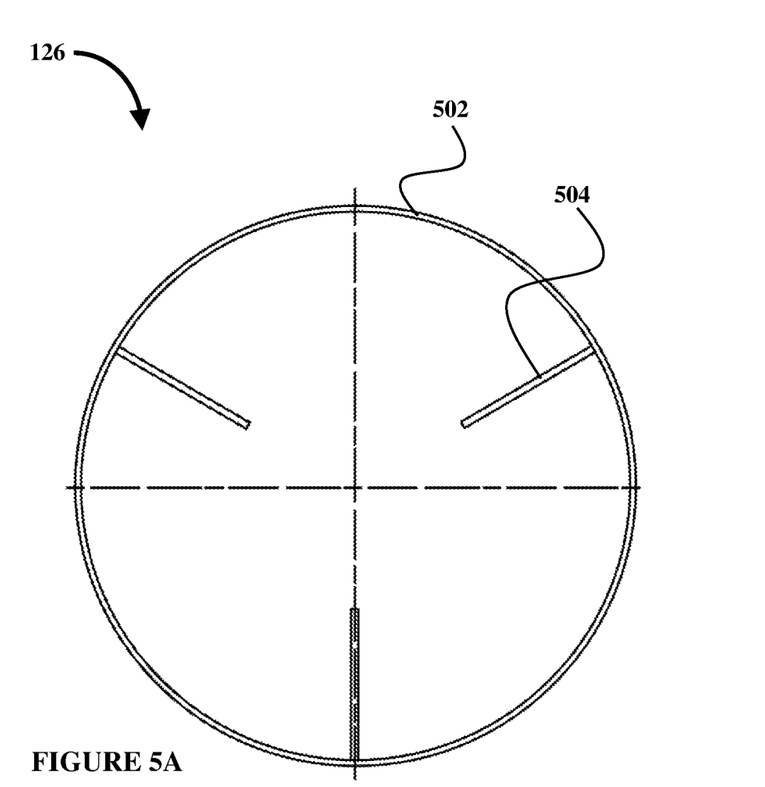
FIG. 5A shows a top view of the pan support of the domestic cooking stove for combustion of LPG fuel that has three metallic resting strips, according to an exemplary embodiment.
Figure 5B:
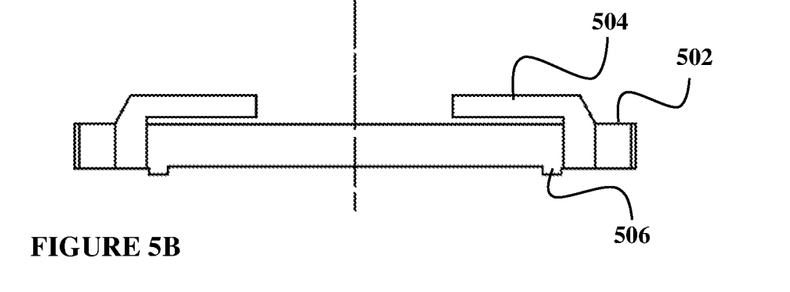
FIG. 5B shows a side view of the pan support of the domestic cooking stove shown in FIG. 5A, according to an exemplary embodiment.

Each burner top 116 is coaxially positioned above the mixing cup/diffuser cup 114 of the mixing tube 108 as shown in FIG. 2, and is in fluid communication with the mixing tube 108. As shown in FIG. 3A, the burner top 116 comprises a set of inner ports 302 and outer ports 304 that are positioned on circumferential surface of the burner top 116 to receive the air-fuel mixture from the mixing tube 108, and the received air-fuel mixture is ignited for combustion. Each pan support 126 is fixed on the frame 122 via pin holes to coaxially align the pan support 126 with the burner top 116. As shown in FIGS. 5A-5B, the pan support 126 comprises a circular metallic element 502 with multiple metallic resting strips 504 that support a bottom surface of a vessel to be heated.

Figure 7A:
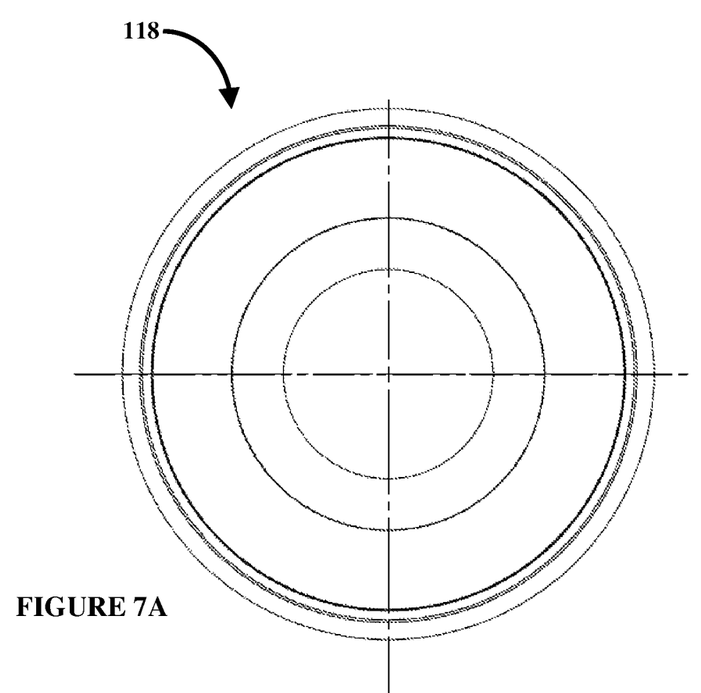
FIG. 7A shows a top view of the heat reflector of the domestic cooking stove for combustion of LPG fuel, according to an exemplary embodiment.
Figure 7B:
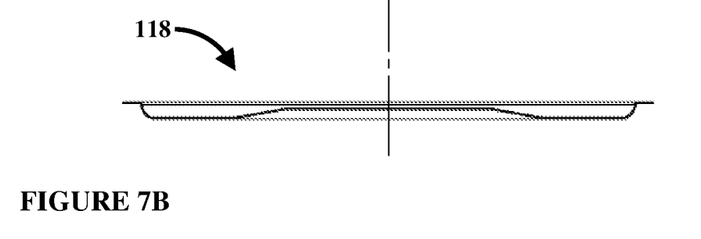
FIG. 7B shows a side view of the heat reflector of the domestic cooking stove shown in FIG. 7A, according to an exemplary embodiment.

As shown in FIGS. 2 and 7A-7B, each heat reflector 118 is coaxially positioned with respect to the burner top 116 and is rested on the frame 122. The heat reflector 118 aids in optimum secondary air entrainment for the combustion and reduces a gap 130 between an inner circumference 118a of heat reflector 118 and an outer circumference 116a of the burner top 116 to optimize secondary air entrainment. The heat reflector 118 has a curved orientation to reduce heat transfer in a downward direction and generates eddies that increases recirculation of heat and increases heat transfer towards vessel bottom. The inner circumference 118a of the heat reflector 118 is formed to control the secondary air entrainment. As shown in FIGS. 1 and 5B, the legs 120 are positioned below the frame 122 of the domestic cooking stove 100 and has a predetermined height to maintain a gap between table top and the frame bottom surface 122 for entrainment of air.

A table showing thermal efficiency of the domestic cooking stove 100 during a testing conducted in a laboratory is given below:

| Sl. No. | Burner Name | Vessel No. | LPG Flow rate (LPH) | Thermal Efficiency (%) |
| --- | --- | --- | --- | --- |
| 1 | BPCL 1 | 5 | 71-75 | 74 ± 1 |
| 2 | BPCL 2 | 4 | 61-65 | 74 ± 1 |

The domestic cooking stove 100 is found to provide higher thermal efficiency as compared to existing star 1 BIS approved LPG cooking stoves that are available in market. The domestic cooking stove 100 has resulted in providing a thermal efficiency of 74±1%. Another tests was eventually carried out in a BIS certified laboratory, where the results obtained during the test in the BIS certified laboratory were significantly matching with the aforementioned values of thermal efficiency.

FIG. 3A shows top view of the burner top 116 of the domestic cooking stove 100 for combustion of LPG fuel, according to an exemplary embodiment. The burner top 116 comprises a set of inner ports 302 and outer ports 304. In an embodiment, a first type of the burner top 116 as specified in BIS standard IS 4246: 2002 comprises:

a total port area for each of the inner and outer ports 302 and 304 ranging between 155 mm2 and 325 mm2;

a port diameter for each of the inner and outer ports 302 and 304 ranging between 1.5 mm and 2.5 mm;

number of the inner ports 302 ranging between 14 and 24;

number of the outer ports 304 in an upper row on the outer circumferential surface ranging between 14 and 24; and number of the outer ports 304 in a lower row on the outer circumferential surface ranging between 30 and 46.

Furthermore, this burner top 116 has an inner diameter in the range between 19 mm and 34 mm and an outer diameter in the range of 60 mm and 74 mm, for LPG flow rate of 61 to 65 LPH.

In another embodiment, a second type of the burner top 116 as specified in BIS standard IS 4246: 2002 comprises:

a total port area for each of the inner and outer ports 302 and 304 ranging between 255 mm2 and 485 mm2;

a port diameter for each of the inner and outer ports 302 and 304 ranging between 1.5 mm and 2.5 mm;

number of the inner ports 302 ranging between 24 and 34;

number of the outer ports 304 in an upper row on the outer circumferential surface ranging between 24 and 34; and number of the outer ports 304 in a lower row on the outer circumferential surface ranging between 50 and 66.

Furthermore, this burner top 116 has an inner diameter in the range of 23 mm to 37 mm and outer diameter in the range of 70 mm and 85 mm, for LPG flow rate of 71 to 75 LPH.

Figure 3B:
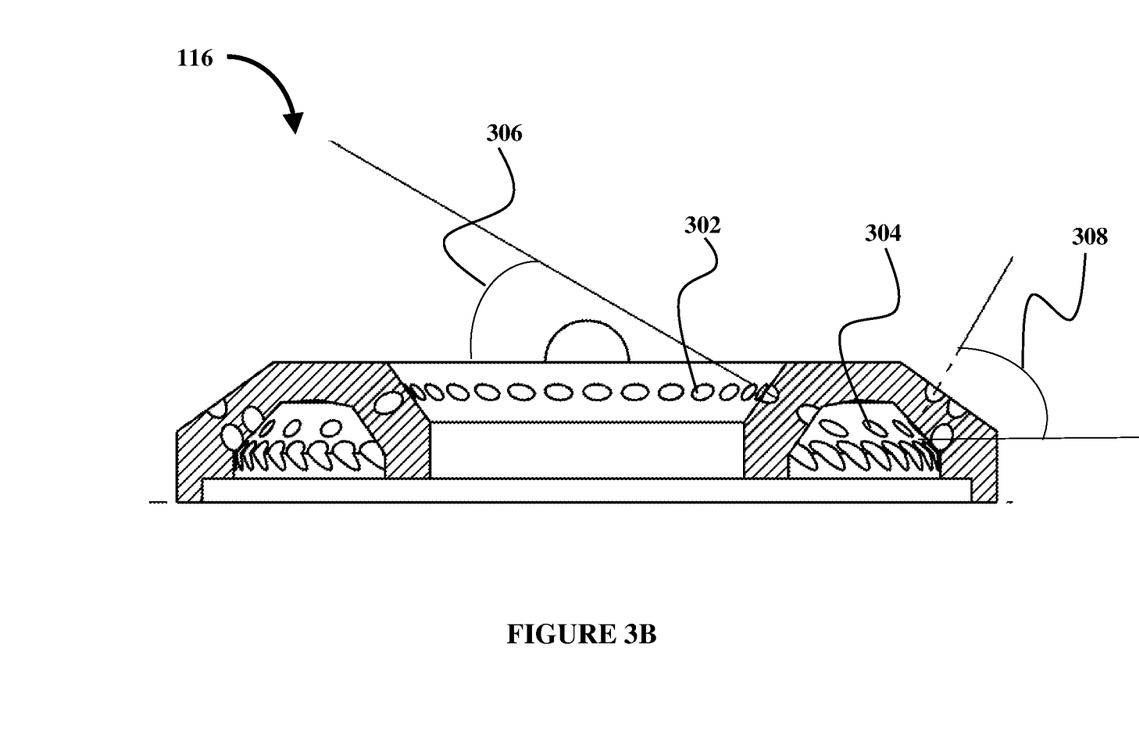
FIG. 3B shows a side sectional view of the burner top of the domestic cooking stove, according to an exemplary embodiment.
Figure 3C:
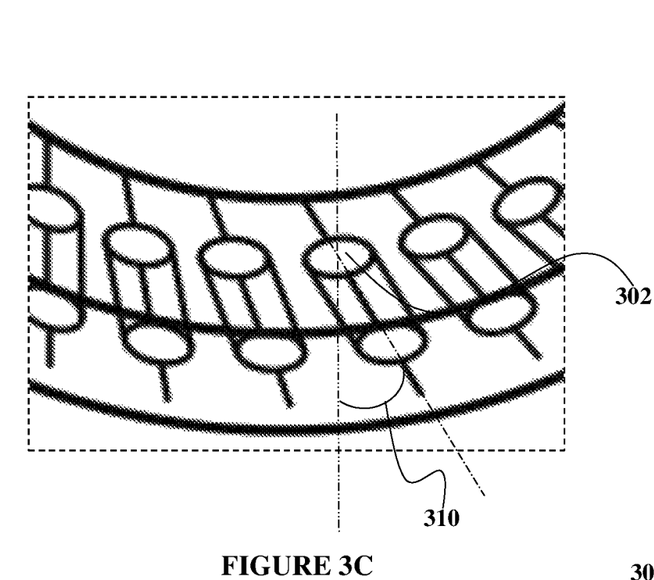
FIG. 3C shows a detailed view of the inner ports and corresponding first angular tilt of the inner ports of the burner top associated with the domestic cooking stove, according to an exemplary embodiment.
Figure 3D:
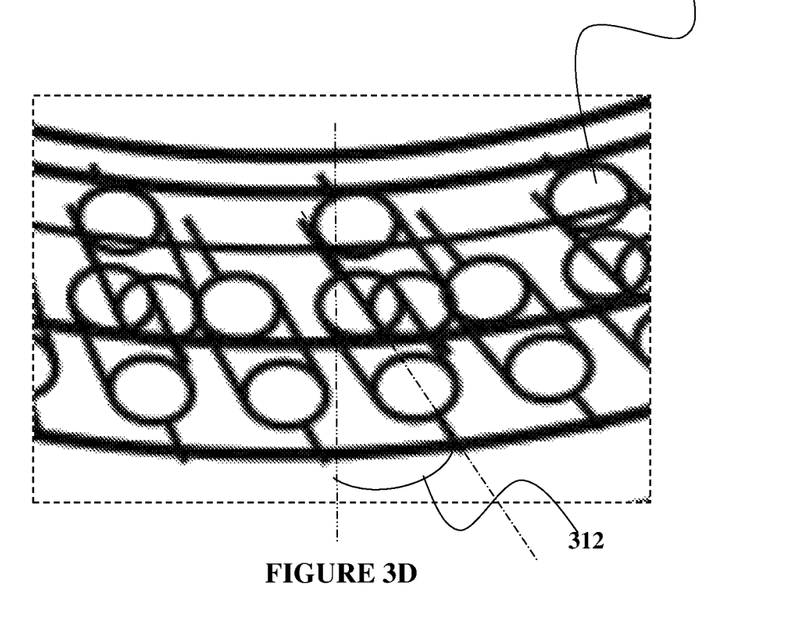
FIG. 3D shows a detailed view of the outer ports and corresponding second angular tilt of the outer ports of the burner top associated with the domestic cooking stove, according to an exemplary embodiment.

FIG. 3B shows a side sectional view of the burner top 116 of the domestic cooking stove 100, according to an exemplary embodiment. As shown in FIG. 3B, the inner port inclination angle 306 of the burner top 116 is 30±10° and outer port inclination angle 308 of the burner top 116 is 60±10°. FIG. 3C shows detailed view of the inner ports 302 and corresponding first angular tilt 310 of the inner ports 302 of the burner top 116 associated with the domestic cooking stove 100. FIG. 3D shows detailed view of the outer ports 304 and corresponding second angular tilt 312 of the outer ports 304 of the burner top 116 associated with the domestic cooking stove 100. In an embodiment, the burner top 116 is designed with optimum orientation of the inner ports 302 and the outer ports 304, number of the inner ports 302 and the outer ports 304, the first angular tilt 310 of the inner ports 302, the second angular tilt 312 of the outer ports 304, and diameter of each of the inner ports 302 and the outer ports 304, for an improved performance of the domestic cooking stove 100. As shown in FIGS. 3C and 3D, the first angular tilt 310 and second angular tilt 312 defined by the inner ports 302 and outer ports 304 respectively, are at an inclination of about 45±20° degrees with a normal surface of the burner top 116.

Figure 4:
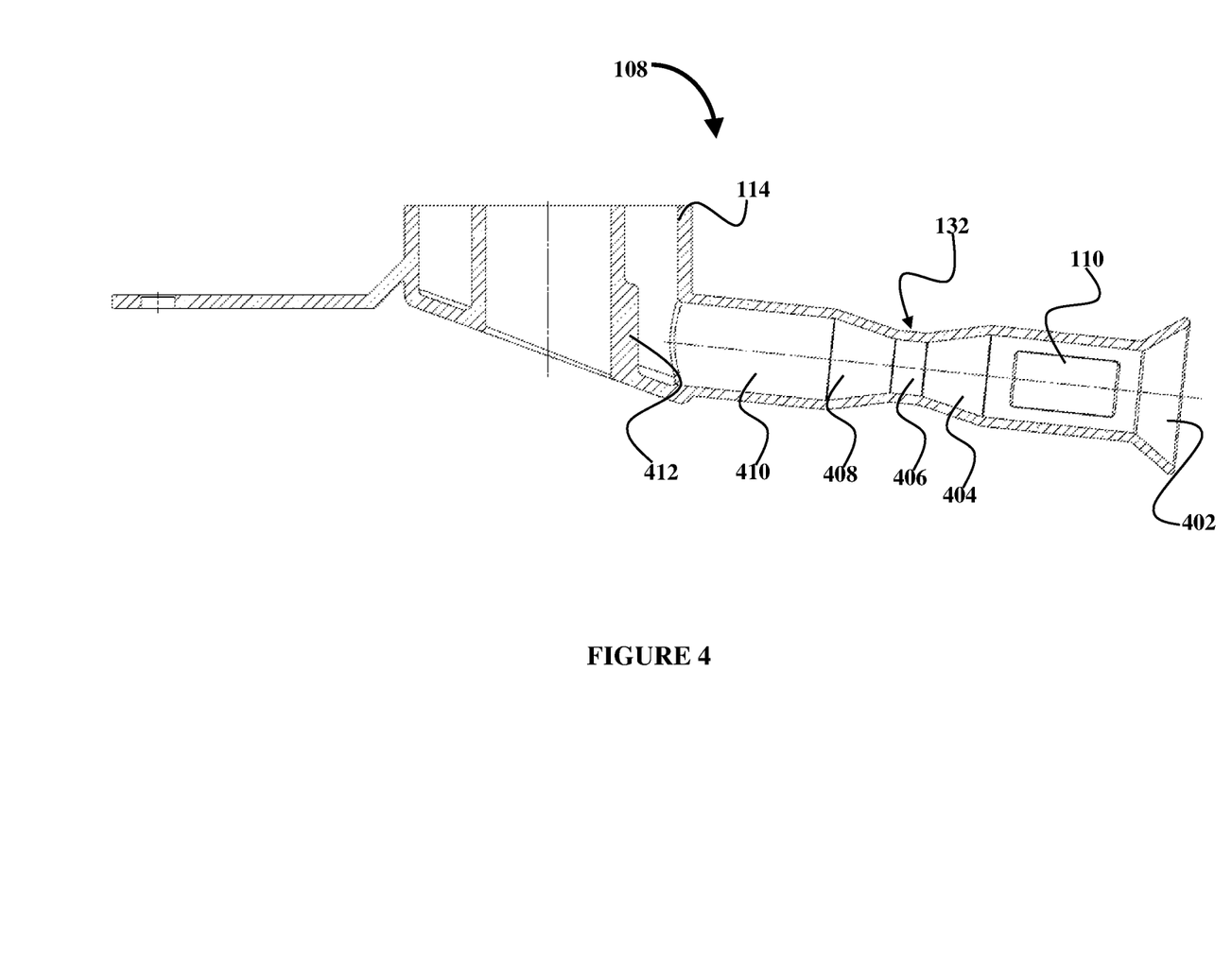
FIG. 4 shows sectional view of a mixing tube of the domestic cooking stove for combustion of LPG fuel, according to an exemplary embodiment.

FIG. 4 shows mixing tube 108 of the domestic cooking stove 100 for combustion of LPG fuel, according to an exemplary embodiment. The mixing tube 108 comprises an inlet opening 402 for receiving the fuel from the nozzle 106 and for partial air entrainment, the slot openings 110 for primary air entrainment, the venturi 132 for modulating pressure gradient of the air fuel mixture, and the mixing cup/diffuser cup 114 to smoothen the flow of the air-fuel mixture. In an embodiment, the venturi 132 comprises a converging section 404, a throat section 406, and a diverging section 408.

The converging section 404 increases velocity of the air-fuel mixture that is received from the nozzle 106, the inlet opening 402, and the slot openings 110 that are positioned after the inlet opening 402. The throat section 406 is in fluid communication with the converging section 404 to receive the high velocity air-fuel mixture. The throat section 406 lowers pressure of the air-fuel mixture, which facilitates transfer of more air through the inlet opening 402. The diverging section 408 of the venturi 132, which is in fluid communication with the throat section 406 regains the pressure of the air-fuel mixture that is received from the throat section 406. The high-pressure air-fuel mixture is then transferred to a straight mixing zone 410 of the mixing tube 108.

For example, the mixing tube 108 has two slot openings 110 provided for the primary air suction that has a length of 21 mm±4 mm and width 12±4 mm. In other words, the mixing tube 108 of the domestic cooking stove 100 provides sufficient primary air entrainment and contact with the LPG fuel that results in generating a better mixture of LPG and air for combustion. In an embodiment, the 'venturi effect' due to the venturi 132 controls pressure gradient in the mixing tube 108 and ensures trouble free and smooth movement of LPG-air mixture. The positioning of the venturi 132 adjacent to the slot openings 110 that act as primary air openings, provide better mixing of LPG and air. A triangular section 412 is provided in mixing cup/diffuser cup 114 of mixing tube 108 to reduce back pressure because of the impact from the air-fuel flow and smoothen the flow in the tube side.

In a first embodiment, a first type of the mixing tube 108 comprises a LPG flow rate of 61 to 65 LPH, corresponding vessel number 4, and BIS standard IS:4246, wherein the first type of the mixing tube 108 comprises:
 The inlet opening 402 with a length in a range between 5.5 mm to 13.5 mm and an angle of convergence within a range between of 65 to 75 degrees;
 The cylindrical pipe 112 with a length within a range between 97 mm and 107 mm, and a diameter within a range between 17 mm and 27 mm;
 Each slot opening 110 with a length within a range between 17 mm and 25 mm, and a width within a range between 8 mm and 16 mm;
 The venturi 132 with a length within a range between 30 mm and 38 mm, and the venturi 132 further comprises:
  the converging section 404 with a length within a range between 9.5 mm and 17.5 mm,
  the throat section 406 with a length within a range between 3 mm and 11 mm and diameter within a range between 11.5 mm and 20 mm, and
  the diverging section 408 with a length within a range between 9.5 mm and 18 mm;
 The mixing zone 410 with a length within a range between 26 mm and 36 mm, and a diameter within a range between 17 mm and 27 mm; and
 The mixing cup/diffuser cup 114 with an outer diameter within a range between 58.50 mm and 66.50 mm and an inner diameter within a range between 29 mm and 37.5 mm.

In a second embodiment, a second type of the mixing tube 108 comprises a LPG flow rate of 71 to 75 LPH, corresponding vessel number 5, and BIS standard IS:4246, wherein the second type of the mixing tube 108 comprises:
 The inlet opening 402 with a length within a range between 6.5 mm and 15.5 mm and an angle of convergence within a range between 65 degrees and 75 degrees;
 The cylindrical tube 112 with a length within a range between 100 mm and 111 mm and a diameter within a range between 18 mm and 28 mm;
 Each slot opening 110 with a length within a range between 19.5 mm and 30.5 mm and a width within a range between 9 mm and 19 mm;
 The venturi 132 with a length within a range between 30 mm and 40 mm, and the venturi 132 further comprises:
  the converging section 404 with a length within a range between 9 mm and 19 mm,
  the throat section 406 with a length within a range between 2.5 mm and 11.5 mm and diameter within a range between 11.7 mm and 21.7 mm, and
  the diverging section 408 with a length within a range between 9 mm and 19 mm;
 The mixing zone 410 with a length within a range between 27 mm and 37 mm and a diameter within a range between 18.5 mm and 28.5 mm; and
 The mixing cup/diffuser cup 114 with an outer diameter within a range between 68.5 mm and 78.5 mm and an inner diameter within a range between 33.5 mm and 43.5 mm.

FIGS. 5A and 5B show different embodiments of pan support 126. FIGS. 5A and 5B shows the pan support 126 of the domestic cooking stove 100 for combustion of LPG fuel that has three metallic resting strips 504 that are positioned on a circular metallic element 502, according to an exemplary embodiment. In an embodiment, the metallic resting strips 504 of the pan support 126 are positioned at the equidistant intervals with a controlled height for optimal distance between a burner top 116 and the bottom surface of the vessel.

The design of the pan support 126 is, for example, constructed to create a loading height of about 21±7 mm between the burner top 116 and the flat bottom vessel base. The diameter of pan support 126 is, for example, 215±25 mm for burner of LPG flow rate 71 to 75 LPH and corresponding vessel number 5 (as specified in BIS standard IS 4246: 2002) and 195±25 mm for burner of LPG flow rate 61 to 65 LPH and corresponding vessel number 4 (as specified in BIS standard IS 4246: 2002). The height of each metallic resting strip 504 should be 12±6 mm for the proper spacing between the vessel bottom and the burner top 116. The spacing of the metallic protrusions 506 should be equal for proper fitment of the pan support 126 on the burner body. All the other dimensions are less critical. Material used for making the pan support 126 is MS and to get finished product, powder coating is performed. The pan support 126 is suitable for a vessel size ranging with external diameter from, for example, 178 mm to 297 mm. This embodiment of the pan support 126 is capable of exhibiting the improved thermal efficiency under varying conditions of gas flow rate and vessel size.

Figure 6:
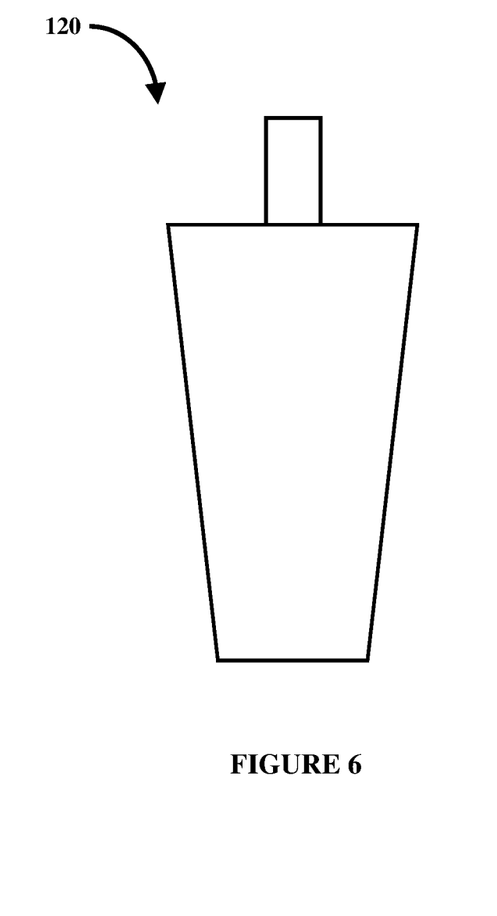
FIG. 6 shows a side view of a leg of the domestic cooking stove, according to an exemplary embodiment.

FIG. 6 shows a leg 120 design. As shown in FIG. 6, the predetermined height of each leg 120 is within a range between 14 mm and 24 mm to maintain the gap between the table top and the frame bottom surface 122 for optimum entrainment of air.

FIGS. 7A and 7B show a heat reflector 118 of the domestic cooking stove 100 for combustion of LPG fuel. The design of the heat reflector 118 is based on secondary air entrainment by reducing the gap 130 between inner diameter 118a of heat reflector 118 and outer circumference 116a of burner top 116, as discussed in FIG. 2. The design of heat reflector 118 plays an important role in minimizing heat losses. In an embodiment, the heat reflector 118 has a predetermined thickness within a range between 0.3 mm and 0.7 mm. The heat reflector 118 has an internal diameter of 75 mm to 85 mm for vessel number 5 specified in BIS standard IS 4246: 2002, and an internal diameter of 65 mm to 75 mm for vessel number 4 specified in BIS standard IS 4246: 2002 to ensure the gap 130 within a range between 0 mm and 5 mm, between the inner edge 118a of the heat reflector 118 and the outer edge 116a of the burner top 116.

Hence, the domestic cooking stove 100 that is designed on the basis of detailed description of FIGS. 1-7B, has a thermal efficiency in a range between 73% and 75%.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore, contemplated that such modifications can be made without departing from the spirit or scope of the present invention as defined.

We claim:

1. A domestic cooking stove comprising:
   a frame to mount a primary tube, one or more nozzles, one or more knobs, one or more mixing tubes, one or more burner tops, one or more pan supports, one or more heat reflectors, and a plurality of legs;
   the primary tube is mounted within the frame to receive fuel;
   each nozzle is in fluid communication with the primary tube to receive the fuel and inject the fuel into the one or more mixing tubes at a controlled rate using each knob that is connected to each respective nozzle through a nozzle holder assembly;
   each mixing tube is in fluid communication with each nozzle to receive the injected fuel from each respective nozzle, wherein each respective mixing tube allows primary air entrainment through one or more slot openings and mixes the primary air with the injected fuel, and wherein each respective mixing tube modulates pressure gradient of the air-fuel mixture through each venturi contained in each respective mixing tube and the air-fuel mixture passes through a cup of each respective mixing tube towards each respective burner top;
   each burner top is coaxially positioned above the cup of the mixing tube and is in fluid communication with the mixing tube, wherein each respective burner top comprises a set of inner ports and outer ports positioned on circumferential surface of each respective burner top to receive the air-fuel mixture from the mixing tube, wherein the received air-fuel mixture is ignited for combustion;
   each pan support is fixed on the frame via pin holes to coaxially align each respective pan support with the burner top, wherein the pan support comprises a circular metallic element with a plurality of metallic resting strips that support a bottom surface of a vessel to be heated;
   each heat reflector is coaxially positioned with respect to the burner top and is rested on the frame, wherein each respective heat reflector aids in optimum secondary air entrainment for the combustion and reduces an annular gap between an inner circumference of heat reflector and an outer circumference of the burner top to minimize heat losses, wherein the heat reflector has a curved orientation to reduce heat transfer in a downward direction and generates eddies that increases heat transfer towards vessel bottom; and
   each plurality of legs are positioned below the frame of the domestic cooking stove, wherein each leg has a predetermined height to maintain a gap between table top and frame bottom surface for entrainment of air.

2. The domestic cooking stove as claimed in claim 1, wherein each burner top is designed with optimum orientation of the inner ports and the outer ports, number of the inner ports and the outer ports, a first angular tilt of the inner ports, a second angular tilt of the outer ports, and diameter of each of the inner ports and the outer ports.

3. The domestic cooking stove as claimed in claim 1, wherein each pan support is designed to create a loading height within a range between 15 mm and 25 mm, between the burner top and the bottom surface of the vessel.

4. The domestic cooking stove as claimed in claim 1, wherein the plurality of metallic resting strips of each pan support are positioned at equidistant intervals with a controlled height for optimal distance between the respective burner top and the bottom surface of the vessel.

5. The domestic cooking stove as claimed in claim 1, wherein the venturi comprises:
   a converging section to increase velocity of the air-fuel mixture that is received from each respective nozzle, each respective inlet opening, and the one or more slot openings that are positioned after each respective inlet opening;
   a throat section in fluid communication with the converging section to receive the high velocity air-fuel mixture, wherein the throat section lowers pressure of the air-fuel mixture and that facilitates transfer of more air through each respective inlet opening, wherein a diverging section of the venturi in fluid communication with the throat section; and
   the diverging section regains the pressure of the air-fuel mixture that is received from the throat section, and wherein the high-pressure air-fuel mixture is transferred to a straight mixing zone of the mixing tube.

6. The domestic cooking stove as claimed in claim 1, wherein the predetermined height of each leg is within a range between 16 mm and 24 mm to maintain the gap between the table top and the frame bottom surface for optimum entrainment of air.

7. The domestic cooking stove as claimed in claim 1, wherein each heat reflector has a predetermined thickness within a range between 0.3 mm and 0.7 mm.

8. The domestic cooking stove as claimed in claim 1, wherein each heat reflector has an internal diameter of 75 mm to 85 mm for vessel number 5 specified in BIS standard IS 4246: 2002, and an internal diameter of 65 mm to 75 mm for vessel number 4 as specified in the BIS standard IS 4246: 2002 to ensure a gap within a range between 0 mm and 5 mm, between the inner edge of the heat reflector and the outer edge of the burner top.

9. The domestic cooking stove as claimed in claim 1, has a thermal efficiency in a range between 73% and 75%.

* * * * *